Sept. 15, 1959     O. E. WOLFF     2,903,829
PROCESS AND APPARATUS FOR FORMING LIQUID-FILLED CONTAINERS
Filed Feb. 26, 1954     3 Sheets-Sheet 1
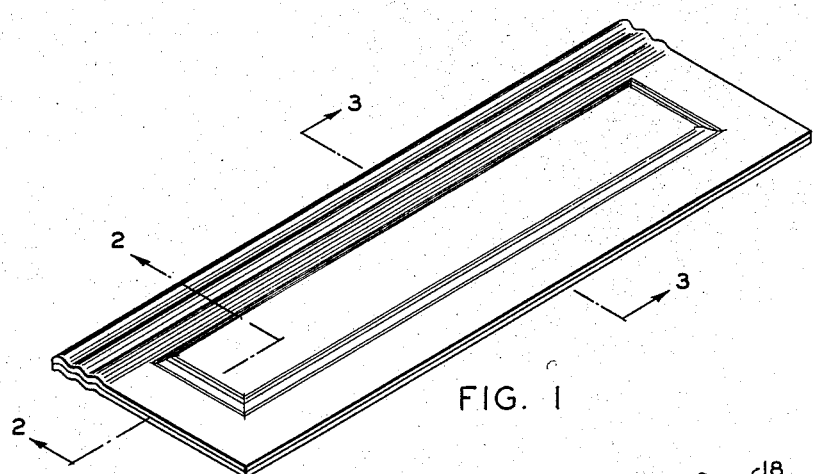
FIG. 1
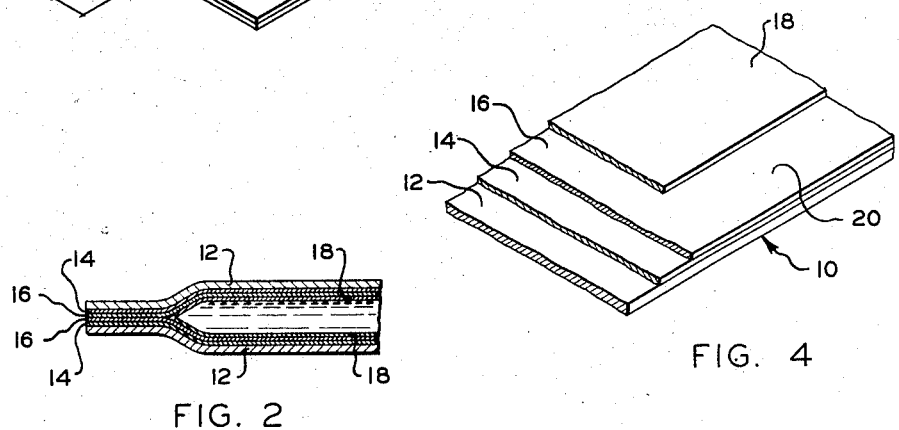
FIG. 2
FIG. 4
FIG. 3
INVENTOR
Otto E. Wolff
BY Broward Mikulka
ATTORNEYS Sept. 15, 1959 O. E. WOLFF 2,903,829
PROCESS AND APPARATUS FOR FORMING LIQUID-FILLED CONTAINERS
Filed Feb. 26, 1954 3 Sheets-Sheet 3

INVENTOR
Otto E. Wolff
BY Brumvard Mikulka
ATTORNEYS

United States Patent Office 2,903,829
Patented Sept. 15, 1959

2,903,829

PROCESS AND APPARATUS FOR FORMING LIQUID-FILLED CONTAINERS

Otto E. Wolff, Sudbury, Mass., assignor to Polaroid Corporation, Cambridge, Mass., a corporation of Delaware Application February 26, 1954, Serial No. 412,780

3 Claims. (Cl. 53—28)

This invention relates to processes and apparatus for forming and filling liquid-carrying containers adapted to predeterminedly release their liquid content.

An object of the present invention is to provide a novel process and apparatus for forming sheet material into elongated liquid-carrying containers, each said container being adapted to release its liquid content over an area substantially equal to its length when subjected to a predetermined mechanical stress.

Another object of the present invention is to provide a novel process and apparatus for continuously forming strips of sheet material into a plurality of liquid-carrying containers, each said container having a predetermined liquid content.

A further object of the invention is to provide a novel process and apparatus for continuously forming strips of sheet material into a plurality of liquid-carrying containers, each container having an elongated liquid-carrying cavity and a sealed passage adjacent the long edge thereof adapted to become uniformly unsealed throughout a length approximately equal to said liquid cavity upon the application of suitable stress to the walls of said container.

Still a further object of the present invention is to provide a novel process and apparatus for continuously sealing the edges of two strips of sheet material to form a tubelike structure, filling said tubelike structure with a predetermined quantity of liquid, shaping said filled tubelike structure to a predetermined cross section containing a uniform distribution of said liquid, transversely sealing the walls of said tubelike structure at regularly spaced intervals to form a strip of sealed compartments, and severing each said compartment at a sealed area to form a plurality of liquid-carrying containers.

Yet another object of the present invention is to provide a novel process and apparatus for transversely sealing and severing the aforementioned tubelike structure so as to provide a plurality of containers, each having a leading edge sealed less securely than its trailing edge.

Other objects of the invention will in part be obvious and will in part appear hereinafter.

The invention accordingly comprises the process involving the several steps and the relation and order of one or more of such steps with respect to each of the others and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a perspective view of a liquid-carrying container formed by the process and apparatus of the herein disclosed invention;

Fig. 2 is a sectional view of the liquid-carrying container of Fig. 1 taken along the line 2—2;

Fig. 3 is a similar view taken along the line 3—3 of Fig. 1;

Fig. 4 is a sectional perspective view of a strip of laminated sheet material from which a liquid-carrying container is formed;

Figure 5:
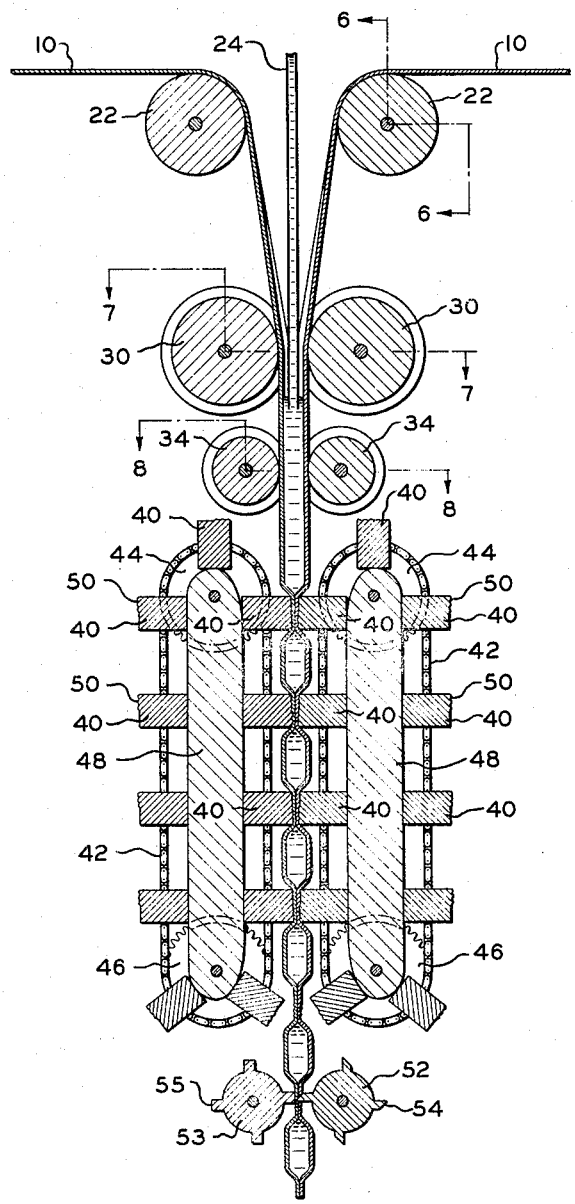
Fig. 5 is a diagrammatic plan view, partially in section, of apparatus embodying the present invention.

The herein disclosed invention is particularly concerned with the production of inexpensive, disposable, liquid-carrying containers, each container being adapted to release its liquid content upon the application of a predetermined mechanical stress. Such a container having an elongated envelope or podlike structure and illustrated in Figs. 1, 2 and 3 is substantially fluid-tight and water-vapor impervious so that the liquid content may be kept intact while it is stored for long periods of time. The container is formed preferably of two strips of multilayer or laminated sheet material inert to the contained liquid and impervious to air and water vapor.

Referring now to Fig. 4, there is shown a strip 10 of laminated sheet material from which a container may be formed, the strip having a width substantially equal to the container length. An outer or base layer 12 serves as a backing or support and is preferably formed of a thin, tough material which may be a plastic but is preferably a paper such as kraft paper. Applied to the surface of layer 12 is a thin film or sheet of a relatively vapor-impervious material such as a metal foil 14 and there is coated on the surface of said foil 14 a further layer 16 of a suitable plastic which can be adhered to itself by the application of heat and/or pressure. Layer 16 is preferably liquid impervious in order to provide a protective coating for the metal foil 14, thereby preventing the contents of the container from reaching the foil to corrode or otherwise deteriorate the same. Coatings 14 and 16 are relatively thin, being only sufficiently thick to be continuous. Along the center of the laminated strip 10 there is provided a layer of a suitable thermoplastic material 18 which has a lesser affinity for itself than the plastic of layer 16 has for itself. Coating 18 is applied along the center of laminated strip 10, leaving marginal portions 20 of the strip uncoated. The layers comprising one preferred form of laminated strip 10 are a base 12 of kraft paper, layer 14 of a silver, aluminum or lead foil and a coating 16 of a thermoplastic material such as a polyvinyl acetal, for example polyvinyl butyral, polyvinyl acetal or polyvinyl formal. When layer 16 is of the foregoing composition, strip 18 may consist of ethyl cellulose or a mixture of ethyl cellulose and paraffin comprising at least 50% by weight of ethyl cellulose.

The container comprises a pair of elongated rectangular strips of multilayer sheet material sealed together at their edges to form an envelope or podlike structure having a liquid-carrying cavity extending substantially the length of said container. The edges of the two strips are sealed together by the application of heat and pressure. Because the edges 20 of the strips 10 comprising the ends of the container have not been coated with layer 18, said layer 18 extending across only the central portion of the strip, the seals at the ends of the container formed by bonding layer 16 with itself are substantially stronger than the seals along the longitudinal edges of the container, formed by bonding layer 18 with itself. In order to provide a sealed passage substantially the length of the liquid-carrying cavity through which the container contents are adapted to be discharged, one of the longitudinal edge seals is weaker than the other longitudinal edge seal. This difference in strength is achieved, preferably, by crimping the strips along one edge as shown or by using differential pressures and temperatures in bonding the edges together. The contents of the container are of a viscosity exceeding a predetermined minimum viscosity and in this viscous condition cooperate with the container structure and sealed passage to insure a uniform peeling apart of the walls of said sealed passage upon the application of compressive pressure to the walls of said container. This pressure may be applied to the entire length of the container by a doctor blade, roll applicator or a pair of pressure-applying rolls and progresses widthwise of said container from said crimped edge in the direction of the sealed passage. The squeezing together of the container walls, particularly during the initial stages of the pressure application, insures an equalization of the hydraulic peeling pressure transmitted by the container contents to the sealed passage prior to rupture of the seal so that further squeezing together of the container walls during the progressive application of the liquid-releasing pressure produces a uniform and complete peeling apart of the marginal walls which consitute the sealed passage. By virtue of the fact that the compressive pressure is applied progressively starting with the crimped edge, rupture of said edge is prevented and peeling apart of the walls of only the sealed passage is assured.

Figure 6:
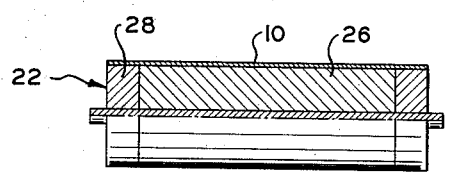
Fig. 6 is a view of one element of the apparatus, partially in section, taken along the line 6—6 of Fig. 5.
Figure 7:
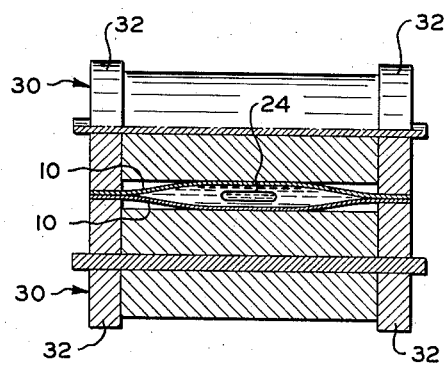
Fig. 7 is a similar view of another element of the apparatus taken along the line 7—7 of Fig. 5.
Figure 8:
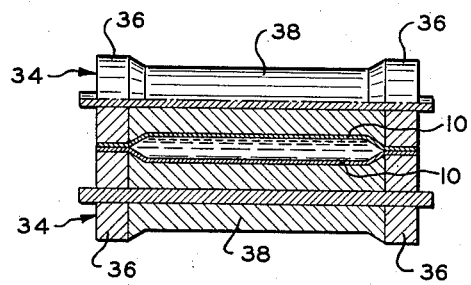
Fig. 8 is a similar view of still another element of the apparatus taken along the line 8—8 of Fig. 5.

Referring now to Fig. 5, there is illustrated apparatus for the production of a plurality of liquid-carrying containers. Two strips 10 of laminated sheet material, as heretofore described and illustrated in Fig. 4, are advanced from the respective supplies over and between a pair of guide means, preferably rollers 22 positioned on opposite sides of a filler tube 24. It may be desirable to pre-heat the lateral edges 20 of strips 10 as they are advanced in contact with rollers 10 and in a preferred form (Fig. 6) rollers 22 may be provided with a central unheated portion 26 and end portions 28, including suitable internal heating means, adapted to contact the lateral edges of strip 10. In addition, heating elements may be provided disposed along the paths of strips 10 adjacent the lateral edges of said strips for pre-heating said strips as they are advanced from rollers 22.

Strips 10 are fed from rollers 22 on opposite sides of filler tube 24 between a pair of edge sealing rollers 30. Rollers 30 are provided with raised heating portions or flanges 32 adjacent their ends and means are provided for urging rollers 30 toward one another so that they mutually engage the lateral edges of strips 10. Flanges 32 are provided with suitable internal heating means and are adapted to bond or fuse together layers 16 along the edges of strips 10 to form a generally flat tubelike structure surrounding filler tube 24.

Filler tube 24, connected with a reservoir and suitable pump means, is adapted to feed liquid into the tubelike structure formed by strips 10. While filler tube 24 is illustrated as having a substantially flat or ellipsoidal cross section generally conforming to the cross section of the surrounding tubelike structure, a plurality of smaller or round tubes may also be provided in order to uniformly distribute the liquid within said tubular structure.

The tubular structure comprising strips 10 is advanced from edge sealing rollers 30 between a pair of shaping or distributing elements such as dies and preferably rollers 34. Distributing rollers 34 are adapted to mutually engage the liquid-filled tubular structure slightly compressing the latter, shaping the wall section thereof to a predetermined cross section and uniformly distributing the liquid within said tubular structure uniformly from side to side thereof. Rollers 34 are provided with raised flanges 36 at their ends, said flanges tapering to recessed central portions 38 conforming substantially to the predetermined cross section of the liquid-carrying cavity of a container.

Filler tube 24 extends within the tubular structure to a point generally midway between edge sealing rollers 30 and distributing rollers 34. By reducing the cross section of the filler tube structure at rollers 34, the level of liquid in the tubular structure may be maintained at a point above the end of filler tube 24 and preferably at a point between rollers 30. By virtue of the foregoing arrangement and by reducing the cross-sectional area of the tubular structure to maintain the level of liquid above the end of the filler tube 24, the tubular structure is assured of being completely filled with the liquid and air or gas comprising the surrounding atmosphere is prevented from being entrapped in the liquid.

To advance strips 10 and the tubular structure formed thereby through the apparatus, suitable drive means are provided for rotating at least edge-sealing rollers 30 and while rollers 22 may be idler rollers and the tubular structure may be shaped by a pair of dies instead of rollers 34, it is to be understood that rollers 22 and 34 may be rotated by said driving means.

Means are provided for transversely sealing the liquid-filled tubular structure at regularly spaced intervals. These means include a plurality of pairs of dies 40 each having mutually engageable surfaces 50 at one end and between which said tubular structure is continuously advanced. Dies 40 are pivotally mounted at their sides at regularly spaced intervals between pairs of conventional drive chains 42, said drive chains 42 extending between upper sprockets 44 and lower sprockets 46, said sprockets being so positioned with respect to the path of the tubular structure that drive chains 42 extending between sprockets 44 and 46 are parallel to said tubular structure. Support elements 48 are provided having surfaces substantially parallel to the drive chains against which the other end of each of dies 40 is adapted to bear, the surfaces of support elements 48 being adapted to predeterminedly position pairs of opposed dies with respect to one another and with respect to the tubular structure. Suitable resilient means may be provided for urging support elements 40 towards one another. In addition to supporting and urging pairs of dies toward each other, support elements 48 may be provided with internal heating means, the heat therefrom being conducted from said support elements 48 into dies 40. Suitable drive means are provided for rotating sprockets 44 and 46 so as to advance dies 40 in the same direction and at the same speed as the tubelike structure and to advance the latter from rollers 34. As a pair of dies are rotated around their respective sprockets 44, they engage and compress a portion of the tubular structure between their engagement surfaces 50, forcing the liquid from between strips 10 and bonding or sealing strips 10 together at layer 18. To insure proper transverse sealing of a tubular structure, heat and pressure must be maintined by dies 40 on strips 10 for a predetermined period, this period being a function of the speed of advancement of the tubular structure and a number of the pairs of dies adapted to engage said structure as it is advanced. It is apparent that the production rate of containers can be increased or decreased by varying the speed of advancement of strips 10 and the number of pairs of dies.

As a pair of dies 40 continues to advance in engagement with the tubular structure and the next successive pair of dies 40 engages said structure, the liquid is trapped within said structure between successive pairs of dies to form a series of connected, liquid-filled compartments or pods. Cutting means are provided adjacent lower sprockets 46 for severing each successive compartment or pod substantially at the mid-point of the transverse seal connecting the compartments. In one form of the invention, this cutting means may comprise a pair of cylindrical members 52 and 53 on which are mounted, respectively, a plurality of regularly spaced cutting blades 54, and a plurality of regularly spaced anvils 55 against which blades 54 are adapted to act. Members 52 and 53 are so mounted with respect to a strip of connected compartments and each other, and the speed of rotation of said members 52 and 53 is so synchronized with respect to the speed of advancement of said strip of connected compartments, that rotating knives 54 cooperate with anvils 55 to sever each liquid-filled compartment at the transverse seal, the liquid-filled container thus formed then dropping into some convenient receptacle.

Figure 9:
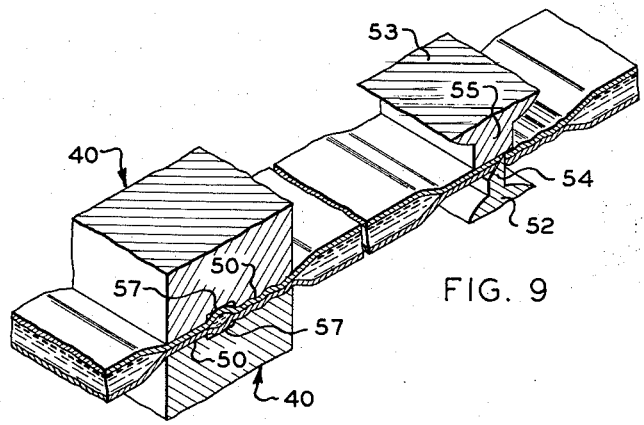
Fig. 9 is a perspective view, partially in section and with parts broken away, of elements of the apparatus.

In order to provide each liquid-filled container with a rupturable sealed passage at its leading edge (as it is advanced through the apparatus) and a crimped sealed passage of substantially greater strength at its opposite or trailing edge, each pair of dies 40 may be formed with portions of their mutually engageable surfaces 50 being smooth and other portions of said surfaces being suitably serrated or grooved for crimping strip material 10. Substantially half of the opposed engageable surface 50 of each of a pair of dies 40 may be smooth and the other half of the surface may be grooved or serrated so as to crimp portions of strips 10 compressed between said surfaces. In another form of die 10, useful in the present invention and illustrated in Fig. 9, a portion of each of the mutually engageable die surfaces 50 between the plane and serrated portions, and indicated at 57, is relieved or recessed. These recesses 57 permit expansion of the two strips 10 at this point due to any small quantities of liquid which may have become trapped between strips 10 and are not forced from between the strips into adjoining compartments. The compartments are then severed from one another at their sealed portions along a line between the smooth and crimped areas of the seal.

While the process and apparatus disclosed herein are adapted for forming a sealed container having a single, elongated, liquid-carrying cavity and a sealed passage substantially equal in length to the cavity, it may be desirable to form elongated containers having a plurality of liquid-carrying cavities and a sealed passage extending substantially the entire length of said container through which the liquid contents of said cavities may be discharged. Such a container, disclosed in the copending application of Edwin H. Land et al., Serial No. 347,684, filed April 9, 1953, for Liquid-Carrying Containers, now U.S. Patent No. 2,750,075, is adapted to resist the tendency of the liquid in a particularly long container to concentrate at the lower end of said container when the latter is stored in other than a horizontal position. In apparatus for forming containers each having two or more liquid-filled compartments or cavities, edge sealing rollers 30 may include one or more circumferential shoulders or raised portions spaced between flanges 32 and adapted to compress and seal layers 18 of strips 10 to form a structure having a plurality of tubular sections. Instead of a single filler tube 24, there may be provided a plurality of filler tubes each extending into one of said tubular sections. Shaping or distributing rollers 34 would then have a structure adapted to compress each tubular section and uniformly distribute the liquid within said section.

Since certain changes may be made in the above process and apparatus without departing from the scope of the invention herein involved, it is intended that all matter contained in the above description or shown in the accompany drawings shall be interpreted as illustrative and not in a limiting sense.

What is claimed is:

1. The process of continuously forming liquid-carrying containers each having a sealed passage adapted to become unsealed upon the application of a predetermined physical stress, said process comprising the steps of continuously feeding along the sides of a filler tube two opposed strips of laminated sheet material, each including a surface layer of a first thermoplastic material, along its margins and a surface layer of another thermoplastic material along its mid-portion, applying heat and pressure to the edges of said strips to seal said edges together at said layer of said first thermoplastic material and form a flattened tubular structure, introducing a viscous liquid into said tubular structure through said filler tube, predeterminedly shaping and reducing the cross-sectional area of said liquid-filled tubular structure while maintaining the level of said liquid in said tubular structure so that the discharge end of said filler tube is immersed in said liquid whereby entrapped gases are excluded from said liquid by advancing said liquid-filled tubular structure between a pair of pressure-applying reducing members, transversely sealing said liquid-filled tubular structure at said layers of said other thermoplastic material to form a series of liquid-carrying compartments separated by transverse seals by applying heat and pressure to spaced-apart portions of said tubular structure as said structure is advanced continuously, and severing said liquid-carrying compartments from each other at said transverse seals to form a plurality of liquid-carrying containers.

2. In apparatus for continuously forming a plurality of liquid-carrying containers each having a sealed passage adapted to become unsealed upon the application of a predetermined physical stress, the combination of guide means for feeding two strips of a multilayer sheet material from their respective supplies into face-to-face relation, elongated duct means positioned between said strips and guide means, a pair of pressure-applying rollers, means mounting said pressure-applying rollers on opposite sides of said duct means and urging said rollers toward one another, said strips extending along converging paths from said guide means between said pressure rollers, said pressure rollers including mutually engageable raised shoulders at their ends adjacent the margins of said strips and means for heating said shoulders for sealing the marginal edges of said strips to form a flattened tubular structure surrounding said duct means, the latter being adapted to introduce a liquid into said tubular structure, a pair of reducing rollers, means mounting said reducing rollers on opposite sides of said liquid-filled tubular structure and urging said reducing rollers toward one another, said reducing rollers having substantially parallel peripheries increasing in diameter at their ends to raised shoulders, said reducing rollers defining, in conjunction with one another, a passage of predetermined cross section through which said liquid-filled tubular structure is advanced for shaping the cross section thereof and uniformly distributing said liquid within said tubular structure, said duct means extending within said tubular structure to a location therein between said pressure-applying rollers and said reducing rollers, the cross-sectional area of said passage defined by said reducing rollers being substantially less than the cross-sectional area of the passage formed by said pressure rollers whereby the level of said liquid within said tubular structure is maintained so that the end of said duct means is immersed in said liquid, a plurality of pairs of opposed heating and pressure-applying members, means so mounting said members that successive pairs of said members are movable in engagement with said liquid-filled tubular structure at regularly spaced transverse sections thereof as said structure is continuously advanced, said members being adapted to transversely bond the inner layers of said strips together at said transverse sections to form a plurality of liquid-filled compartments, and cutting means for severing said compartments from one another at said transversely bonded sections to form a plurality of liquid-carrying containers.

3. The apparatus of claim 2 wherein the pressure-applying members of each of said pairs of opposed heating and pressure-applying members have matching mutually engageable surfaces between which said tubular structure is compressed, substantially half of each of said mutually engageable surfaces being smooth and the other half of each of said surfaces being serrated so as to crimp portions of said tubular structure compressed between said surfaces, said surfaces being provided with a longitudinal groove between said serrated and smooth portions thereof, said cutting means being so constructed as to sever said liquid-filled compartments from one another at the juncture of the smooth and crimped portions of said transversely bonded sections.

References Cited in the file of this patent

UNITED STATES PATENTS

| | | |
|---|---|---|
| 1,654,871 | Gage et al. | Jan. 3, 1928 |
| 2,006,376 | Vogt | July 2, 1935 |
| 2,420,983 | Salfisberg | May 20, 1947 |
| 2,533,554 | Byerly | Dec. 12, 1950 |
| 2,723,051 | McCune | Nov. 8, 1955 |